Feb. 1, 1949.   J. A. JENSEN   2,460,352
COUPLING FOR HOSES AND THE LIKE
Filed Aug. 9, 1947   2 Sheets-Sheet 1
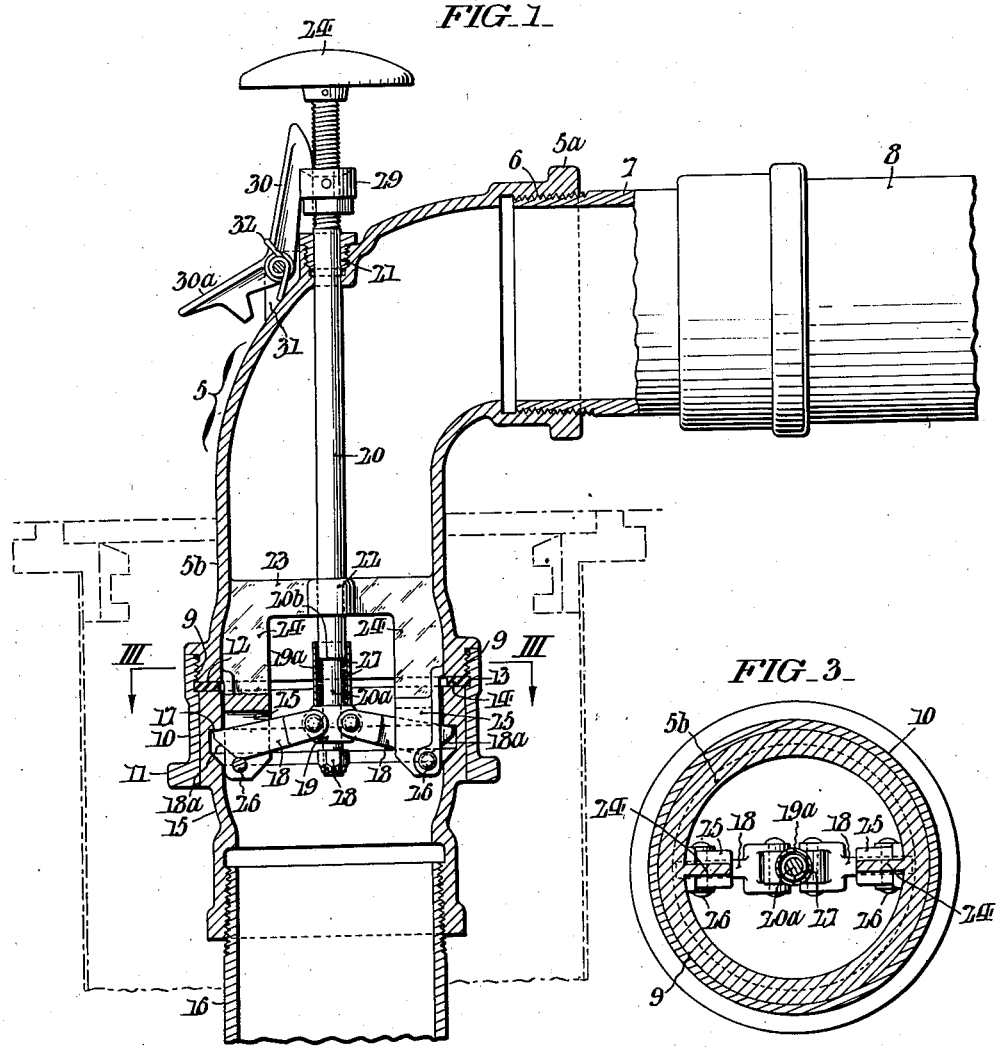
WITNESSES
INVENTOR:
James A. Jensen,
BY Paul & Paul
ATTORNEYS.

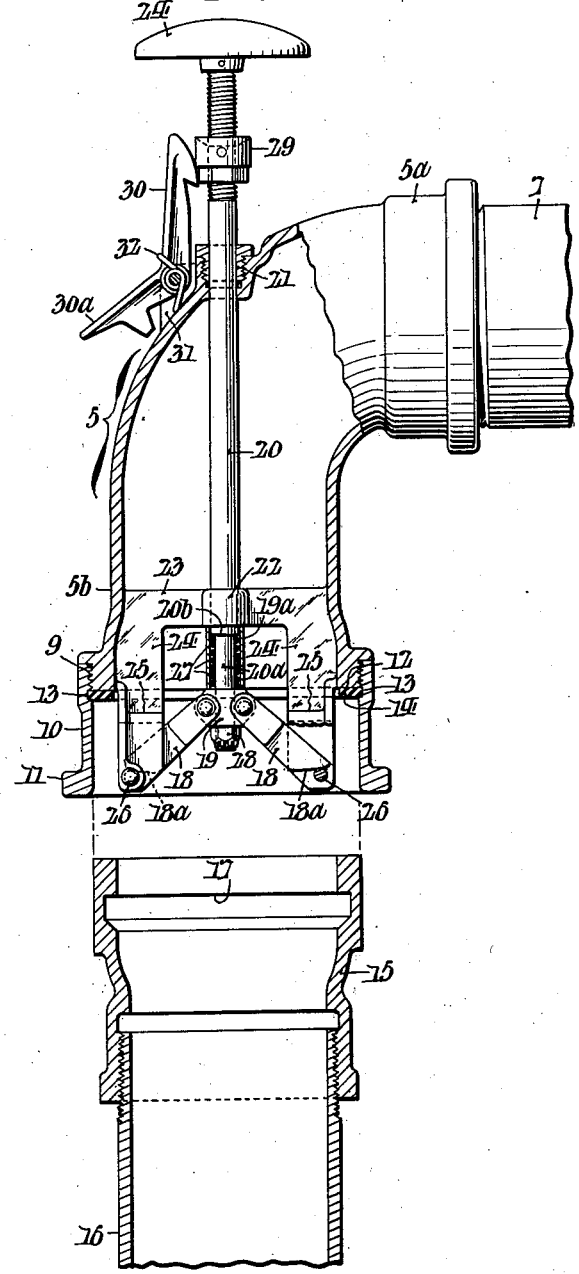

Patented Feb. 1, 1949

2,460,352

UNITED STATES PATENT OFFICE 2,460,352

COUPLING FOR HOSES AND THE LIKE

James A. Jensen, Haverford, Pa., assignor to Philadelphia Valve Company, Philadelphia, Pa., a co-partnership Application August 9, 1947, Serial No. 767,792

5 Claims. (Cl. 285—170)

This invention relates to couplings useful in connecting tube or pipe sections one to another. More particularly it has reference to couplings of a quick-release type for connecting hoses to pipes, for example, hoses such as carried on oil or other liquid commodity delivery vehicles to the fill pipes of underground storage tanks.

In the main, my invention is directed toward provision of a coupling intended more particularly for the latter purpose, which is simple in construction; which is inexpensive to fabricate in quantity; which is easily and quickly applied and removed; which is secure against the possibility of accidental displacement when attached; and which, moreover, can be relied upon for maintenance of a fluid tight seal between the coupled parts.

How the foregoing and other important advantages are attained in practice will appear from the following detailed description of the attached drawings, wherein Fig. 1 is a view partly in elevation and partly in section of a hose coupling conveniently embodying my invention and showing the same attached to a pipe or conduit.

Fig. 2 is a view like Fig. 1 showing the coupling detached from the pipe or conduit; and Fig. 3 is a cross section taken as indicated by the angled arrows III—III in Fig. 1.

As herein delineated, my improved coupling has a hollow body 5 which, as shown, may be in the form of an elbow whereof the inlet end 5a is tapped as at 6 to receive the threaded end of the terminal nipple 7 of a hose 8. The other end or outlet 5b of the elbow 5 is externally threaded as at 9 for connection thereto of an annulus 10 to constitute a shroud or bell 11 prolongation beyond a circumferential internal shoulder at 12. If desired or found more convenient in practice, the bell 11 may be made integral with the elbow. Lodged in an annular groove 13 within the bell 11 so as to lie against the shoulder 12, is a gasket 13 of compressible material which is intended to seal against the end of a tubular element 15 to which the coupling is to be connected with said bell fitting telescopically thereover. As herein exemplified, this tubular element 15 has the form of an adapter at the top of a fill pipe 16 leading to an underground storage tank for oil or the like, not illustrated. As shown, the adapter 15 has an internal annular shoulder projection 17 for engagement by the outer ends of a pair of diametrically arranged latch dogs 18 whereof the inner ends are pivoted to a collar 19 mounted with capacity for limited sliding movement on the diametrically reduced inner end 20a of an actuating rod 20. This actuating rod 20 is axially disposed within the outlet end of the elbow 5 and extends to the exterior with fluid tightness, through a stuffing box 21 in the rounded wall portion of the elbow at the top. Adjacent its lower end, the rod 20 is guided in a bearing boss 22 centrally of a crosswise web 23 within the elbow, and at its protruding end is provided with a push-pull grasp head 24. Pendent from the web 23 at diametrically opposite points are prolongations 24 which terminate in clevises as at 25 for passage of the dogs 18 through them. The outer ends of the dogs 18 are bevelled as at 18a for camming action with supports in the form of pins 26 extending transversely of the clevises on which they rest. Disposed between the collar 19 and a shoulder 20b on the rod 20 is a loaded compression spring 27 which is surrounded by an upward sleeve extension 19a of said collar. Downward movement of the collar 19 is limited by a stop nut 28 at the lower end 20a of the rod 20. The upper protruding end of the rod 20 is threaded to permit adjustment thereon of a collar 29. A retractable hooked keeper element 30, by cooperation with the collar 29, holds the thrust rod 20 depressed against the action of spring 27 with the latch dogs 18 engaged beneath the circumferential shoulder projection 17 interiorly of the end 5b of the elbow. As shown, the keeper 30 is pivotally connected between ears 31 at the exterior of the elbow 5 and provided with a finger press 30a. The torsion spring indicated at 32 serves to yieldingly urge the hook end of the keeper 30 inward for maintenance in engagement with the collar 29.

With the actuating rod 20 depressed and locked by the keeper 30 as in Fig. 1, the spring 27 in acting upon the slide collar 19 is effective to maintain the dogs 18 thrust outward with their ends lodged beneath the internal shoulder of the adapter 15 on pipe 16. As a result, the elbow 5 is firmly secured against accidental displacement to the pipe 16 with the gasket 13 under sufficient compression to prevent leakage between the internal shoulder 12 of the elbow 5 and the top edge of said pipe. Greater compression of the gasket 13 may be attained through adjustment of the collar 29 along the rod 20.

The elbow 5 is released for removal by pressure upon the tab 30a of keeper 30 to withdraw the hook of the latter from the collar 29, whereupon the spring 27 immediately reacts upon the slide collar 19 to lift the actuating rod 20 until the nut 28 engages said collar. The head 24 is then grasped and the rod 20 pulled upward. As a result, the sleeve extension 19a eventually contacts the bottom of the cross web 23 which thus constitutes an abutment stop therefor as in Fig. 2, with incidental retraction of the latch dogs 18 from beneath the internal shoulder 17 of the adapter 15 on pipe 16 as the cam ends of said latches slide on the pins 26. Thereupon, by continued pull on the grasp head 24, the elbow 5 is bodily lifted away from the pipe 16 as shown in Fig. 2.

Application of the elbow is effected by reversal of the above procedure, i. e., the bell end 10 of the elbow 5 is telescoped over the pipe 16 until the gasket 13 seats upon the top edge of the adapter 15. The actuating rod 20 is then pushed downward with attendant outward compression of spring 27 and thrusting of the latch dogs 18 as the cam edges at the outer ends of the latter ride on the pins 26 and said ends engage beneath the internal shoulder 17 of the adapter, the keeper finally hooking itself over the collar 29 automatically under the influence of its spring 32 as in Fig. 1.

From the foregoing it will thus be seen that I have provided a hose coupling which is simple in construction, which is quickly applied and removed, and which is secure against accidental displacement when attached.

Having thus described my invention, I claim:

1. A coupling for a hose or the like comprising a hollow body; a rod constrained to endwise movement within the outlet end of the body; means externally of the body for manipulating the rod; a latch dog having a pivotal connection at one end with the rod and arranged for engagement of its free end behind a shoulder projection internally of a pipe or the like to which the hose is to be connected; means within the body to cooperate with the free end of the dog as and for the purpose set forth; spring means tending to urge the rod in a direction to withdraw the dog from beneath the shoulder projection; and retractable keeper means accessible at the exterior of the body and operative to lock the rod against movement in the direction aforesaid by the spring means with the dog engaged beneath said shoulder.

2. A coupling for a hose or the like comprising a hollow body; an actuating rod guided for endwise movement within the outlet end of the body and extending, for convenience of manipulation, through a wall of the body to the exterior; means for limiting the endwise movement of the rod; a latch dog having a pivotal connection at one end with the rod and arranged for engagement of its free end behind a shoulder projection internally of a pipe or the like to which the hose is to be connected; a supporting rest within the body to cooperate with a cam surface at the free end of the dog as and for the purpose set forth; and retractable keeper means accessible at the exterior of the body for locking the rod against movement with the dog in latching position to prevent accidental dislodgement of the coupling after application to the pipe.

3. The invention according to claim 2, in which the protruding end of the rod has a push-pull grasp; and in which the keeper is in the form of a spring biased hook constructed and arranged to engage over a collar adjustable along the protruding end of the rod.

4. A coupling for a hose or the like comprising a hollow body; an actuating rod guided for endwise movement within the outlet end of the body and extending, for convenience of manipulation, through a wall of the body to the exterior; a spring-biased collar mounted with capacity for limited sliding movement on the inner end of the collar and operative by contact with a fixed abutment internally of the body to limit the outward movement of the rod; a latch dog pivoted at one end to the collar and adapted for engagement of its free end behind a shoulder projection internally of the pipe; a supporting rest within the body to cooperate with a cam surface at the free end of the dog as and for the purpose set forth; and keeper means accessible at the exterior of the body for locking the rod against movement with the dog in latched position to prevent accidental dislodgement of the coupling after its application to the pipe.

5. The invention according to claim 4, in which the projecting end of the rod has a push-pull grasp; and in which the keeper is in the form of a spring-biased hook constructed and arranged to engage over a collar adjustable along the protruding end of the rod.

JAMES A. JENSEN.

REFERENCES CITED

The following references are of record in the file of this patent:

UNITED STATES PATENTS

| Number | Name | Date |
| --- | --- | --- |
| 526,088 | Savill | Sept. 18, 1894 |
| 998,352 | Kublin | July 18, 1911 |
| 1,446,143 | Adams | Feb. 20, 1923 |
| 2,331,020 | Frances | Oct. 5, 1943 |